United States Patent [19]

Aign et al.

[11] 4,186,029
[45] Jan. 29, 1980

[54] AQUEOUS DYESTUFF DISPERSIONS

[75] Inventors: Volker Aign, Monheim; Hans Schulze, Cologne; Fritz Bremer, Leverkusen; Reinhold Hörnle, Cologne; Karlheinz Wolf, Leverkusen; Wilhelm Berlenbach, Odenthal-Blecher; Peter Rasche, Aachen, all of Fed. Rep. of Germany

[73] Assignee: Bayer Aktiengesellschaft, Leverkusen, Fed. Rep. of Germany

[21] Appl. No.: 926,076

[22] Filed: Jul. 19, 1978

[30] Foreign Application Priority Data

Jul. 20, 1977 [DE] Fed. Rep. of Germany ....... 2732732

[51] Int. Cl.$^2$ .............................................. C09D 7/12
[52] U.S. Cl. ................................................ 106/308 Q
[58] Field of Search ................................... 106/308 Q

[56] References Cited

U.S. PATENT DOCUMENTS

| 2,907,670 | 10/1959 | Katz et al. | 106/308 Q |
| 3,004,858 | 10/1961 | Sheehan et al. | 106/308 Q |
| 3,067,053 | 12/1962 | Tarantino | 106/308 Q |
| 3,094,499 | 6/1963 | Gassmann | 106/308 Q |
| 3,210,209 | 10/1965 | Jones et al. | 106/308 Q |
| 3,804,656 | 4/1974 | Kaliski et al. | 106/308 Q |

Primary Examiner—James Poer
Attorney, Agent, or Firm—Sprung, Felfe, Horn, Lynch & Kramer

[57] ABSTRACT

Aqueous dyestuff dispersions which contain water-insoluble dyestuffs and water-soluble oxyalkylation products of compounds which are obtainable by the addition of styrene or its derivatives onto phenols or naphthols, or derivatives of such oxyalkylation products, are suitable for pigmenting natural or synthetic materials.

6 Claims, No Drawings

AQUEOUS DYESTUFF DISPERSIONS

The invention relates to aqueous dyestuff dispersions which contain water-insoluble dyestuffs and water-soluble oxyalkylation products of compounds which are obtainable by the addition of styrene or its derivatives onto phenols or naphthols, or derivatives of such oxyalkylation products, and their use of pigmenting natural or synthetic materials.

Derivatives of styrene which may be mentioned as components or the addition products are, in particular, vinyltoluene, α-methylstyrene and divinylbenzene, and possible phenols are, in addition to phenol itself, above all cresols, xylenols and hydroxydiphenyls. The addition products can be prepared in a known manner, appropriately in the presence of catalysts, such as sulphuric acid, p-toluenesulphonic acid or zinc chloride. The addition products can be subjected to the oxyalkylation as single substances, but it is also possible to use mixtures, such as are in general initially obtained during the preparation.

The products according to the invention can be prepared in a manner which is in itself known, for example according to DT-AS (German Published Specification) 1,121,814.

Preferred oxyalkylation products are those which are obtained by reacting condensation products of 1 to 3 mols of styrene or vinyltoluene and 1 mol of phenol with 12-100 mols of ethylene oxide.

Compounds of the formula

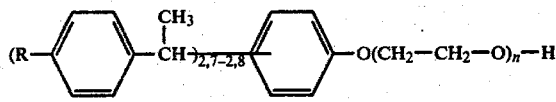

wherein
R denotes hydrogen or methyl and
n denotes a number from 25-30,
are very particularly preferred.

The dyestuff dispersions according to the invention can also contain other customary additives, such as agents which prevent drying out, for example formamide, glycol or diglycol, anionic or non-ionic surface-active agents, for example ethanolammonium dodecylbenzenesulphonate or surface-active addition products of ethylene oxide, and preservatives, for example sodium pentachlorophenolate.

Examples of possible water-insoluble dyestuffs are pigments, disperse dyestuffs, transfer printing dyestuffs and water-insoluble optical brighteners.

The pigments can be organic pigments, for example of the azo, anthraquinone, azaporphin, thioindigo, quinacridone, dioxazine, naphthalenetetracarboxylic acid or perylenetetracarboxylic acid series, or of the polycyclic series, carbon black or inorganic pigments, such as zinc sulphides, cadmium sulphides or selenides, ultramarine, titanium dioxide, iron oxides, nickel titanium yellow or chromium titanium yellow, chromium oxides or chromate pigments.

The disperse dyestuffs include water-insoluble or virtually water-insoluble dyestuffs for polyesters and polyamides, in particular those of the azo, anthraquinone, methine, quinophthalone and aminocoumarin series. Transfer dyestuffs are dyestuffs which sublime at 160°-220°. Sublimable carbinol bases and derivatives of carbinol bases (especially ethers) of cationic dyestuffs are suitable. The water-insoluble optical brighteners belong, for example, to the coumarin, stilbene, naphthalimide or carbostyryl series.

Organic pigments and carbon black are particularly preferred.

The dyestuff dispersions according to the invention contain 20-65%, preferably 30-50%, of dyestuff, 2-35%, preferably 5-20%, of oxyalkylation products according to the invention, 0-20%, preferably 0-5%, of non-ionic or anionic surface-active agents, 5-20% of water-retention agents and 15-40% of water.

The dyestuff dispersions according to the invention are prepared in the customary manner, for example by processing the mixture in conventional wet comminution units, such as kneading screws, ball mills, rotor-stator mills, dissolvers, corundum disc mills, vibratory mills and, particularly advantageously, in kneaders or high-speed stirred ball mills with grinding bodies having a size of 0.1-100 mm $\phi$, in particular with glass beads of 0.2-1 mm $\phi$.

These dyestuff dispersions according to the invention can be universally employed and are suitable for the preparation of emulsion paints based on polyvinyl acetate, polyvinyl acetate copolymers, styrene/butadiene copolymers or acrylonitrile/butadiene copolymers, polyvinyl propionates, acrylic acid ester copolymers and methacrylic acid ester copolymers, water-soluble and water-dispersible alkyd resins and emulsions based on drying oils; for the preparation of wallpaper paints based on cellulose derivatives, such as methylcellulose, hydroxymethylcellulose and carboxymethylcellulose, and for the preparation of printing inks which contain, as the binder material, predominantly saponified natural resins, such as shellac, or water-soluble synthetic resins, such as, for example, saponified polyvinyl acetate or copolymers which are based on acrylic esters and carry carboxyl groups or hydroxyl groups. However, these aqueous dyestuff dispersions are preferably used for pigmenting aqueous systems based on aqueous dispersion binders, such as are employed in textile pigment printing.

Compared with known pigment dispersions for textile pigment printing, the dispersions according to the invention have the advantage that, at the same dyestuff concentration, they have a low viscosity and can be excellently poured and easily pumped, and are thus suitable for processing in automated finishing apparatuses.

The aqueous dispersion, according to the invention, of transfer dyestuffs are particularly suitable for preparing printing inks for printing temporary supports for heat transfer printing.

EXAMPLE 1

400 g of dry Pigment Red 112 (Colour Index 12,370) are added to 100 g of the condensation product of 2.8 mols of styrene and 1 mol of phenol, reacted with 29 mols of ethylene oxide, and the mixture is kneaded into a colour paste in a dispersion kneader. The consistency of the pigment paste to be kneaded is controlled, if necessary by adding water, so that a kneading temperature of 65° to 70° C. is established. After a kneading time of about 20 to 30 minutes, an adequate fine distribution of less than 3$\mu$ is achieved. The pigment paste is then diluted with 150 g of diethylene glycol and an amount of water such that a 40% strength pigment paste is obtained.

EXAMPLE 2

A pigment paste consisting of 40% by weight of dry Pigment Green 7 (Colour Index 74,260), 12% by weight of the oxyalkylation product given in Example 1, 0.5% by weight of a commercially available preservative, 20% by weight of diethylene glycol and 27.5% by weight of water is prepared by kneading, according to Example 1, it being possible for the kneading temperature to rise to 100° C.

EXAMPLE 3

A pigment paste consisting of 37% by weight of carbon black colorant, 9% by weight of the oxyalkylation product given in Example 1, 0.5% by weight of a commercially available preservative, 16% by weight of diethylene glycol and 37.5% by weight of water are prepared by kneading, according to Example 1 (kneading temperature 50° C.).

EXAMPLE 4

Instead of the oxyalkylation products given in Examples 1 to 3, it is also possible to employ those compounds which are obtained by condensation of 2.7 mols of vinyltoluene and 1 mol of phenol, reacted with 28 mols of ethylene oxide.

The formulations prepared according to Examples 1 to 4 are outstandingly suitable for the preparation of printing inks for textile printing.

EXAMPLE 5

A mixture of 48% by weight of dry Pigment Red 119, 4% by weight of the oxyalkylation product given in Example 1, 6.5% by weight of a formaldehyde condensation product with 1 mol of nonylphenol and 1 mol of cyclohexylamine, reacted with 28 mols of ethylene oxide (DT-AS (German Published Specification) 1,041,103), 0.5% by weight of a commercially available preservative, 17% by weight of ethylene glycol and 24% by weight of water is homogenised by stirring and then ground in a continuously operating stirred ball mill with glass beads of 0.3 to 0.5 mm $\phi$ until the particle size is less than $3\mu$.

This formulation is outstandingly suitable for the preparation of emulsion paints and exhibits good compatibility, in particular with acrylic acid ester polymers and methacrylic acid ester polymers.

We claim:

1. Aqueous dyestuff dispersions comprising water-insoluble dyestuff and a water-soluble oxyalkylation product obtained by condensation of 1 to 3 mols of styrene or vinyltoluene and 1 mol of phenol, reacted with 12 to 100 mols of ethylene oxide.

2. Aqueous dyestuff dispersions according to claim 1, which also contain further customary additives.

3. Aqueous dyestuff dispersions according to claim 1, which contain pigments, disperse dyestuffs, transfer printing dyestuffs or water-insoluble optical brighteners as the water-insoluble dyestuff.

4. Aqueous dyestuff dispersions according to claim 1, which contain 20 to 65% by weight of dyestuff, 2 to 35% by weight of said oxyalkylation product, 0 to 20% by weight of nonionic or anionic surface-active agents, 5 to 20% by weight of water-retention agents and 15 to 40% by weight of water.

5. Aqueous dyestuff dispersions according to claim 4, which contain organic pigments or carbon black as the water-insoluble dyestuff.

6. Aqueous dyestuff dispersions according to claim 5, which contain compounds which are obtainable by condensation of 2.7–2.8 mols of styrene or vinyltoluene and 1 mol of phenol, reacted with 25–30 mols of ethylene oxide, as the oxyalkylation product.

* * * * *